United States Patent [19]
Schellekens et al.

[11] Patent Number: 4,810,450
[45] Date of Patent: Mar. 7, 1989

[54] PROCESS FOR THE PREPARATION OF POLYVINYL ALCOHOL ARTICLES OF HIGH STRENGTH AND MODULUS

[75] Inventors: Ronald M. A. M. Schellekens; Hendrikus J. J. Rutten, both of Maastricht; Pieter J. Lemstra, Veldhoven, all of Netherlands

[73] Assignee: Stamicarbon B.V., Geleen, Netherlands

[21] Appl. No.: 105,543

[22] Filed: Oct. 8, 1987

Related U.S. Application Data

[63] Continuation of Ser. No. 898,402, Aug. 20, 1986, abandoned.

[30] Foreign Application Priority Data

Aug. 23, 1985 [NL] Netherlands ......................... 8502315

[51] Int. Cl.$^4$ ................................................ D01F 6/14
[52] U.S. Cl. .................................... 264/185; 264/203
[58] Field of Search ................................ 264/183, 203

[56] References Cited

U.S. PATENT DOCUMENTS

| 3,066,999 | 12/1962 | Nakajo et al. | 264/185 |
| 4,344,908 | 8/1982 | Smith et al. | 264/203 |
| 4,440,711 | 4/1984 | Kwon et al. | 264/185 |
| 4,603,083 | 7/1986 | Tamka et al. | 264/210.8 |

FOREIGN PATENT DOCUMENTS 2132055  1/1972  Fed. Rep. of Germany .

OTHER PUBLICATIONS

The references listed through above have been considered and are listed on reference form PTO-892.

Primary Examiner—James Lowe
Attorney, Agent, or Firm—Cushman, Darby & Cushman

[57] ABSTRACT

High modulus and high strength articles of polyvinylalcohol are obtained by thermoreversible gelation of a 5-50 wt. % solution of a polyvinylalcohol with an $M_W$ of $2.5 \times 10^4$ to $5 \times 10^5$ in water, followed by solvent removal and high stretching.

Pref. gelation is obtained by cooling to a temperature of at least 40° C. below the gelation temperature.

With this process low costs of solvent removal and regeneration are obtained.

8 Claims, No Drawings

PROCESS FOR THE PREPARATION OF POLYVINYL ALCOHOL ARTICLES OF HIGH STRENGTH AND MODULUS

This is a continuation of application Ser. No. 898,402, filed Aug. 20, 1986, now abandoned.

The invention relates to a process for the preparation of polyvinyl alcohol articles of high tensile strength and high modulus.

Synthetic fibres on the basis of polyvinyl alcohol are well-known and have found large-scale application in the form of staple fibres (cut fibres) in the production of, inter alia, paper coating, non-wovens and heavy yarns (canvas, etc.) and in the form of continuous fibres for separation purposes in textile production lines and for reinforcement of rubbers, plastics and other products, and furthermore as precursor of carbon fibres. The fibres used in these applications generally have a tensile strength of 0.3-1.2 GPa and a modulus of 3-30 GPa.

The method of preparation most commonly used for this type of fibre is the so-called wet spinning process. In this process, the polymer is dissolved in a suitable medium to obtain a concentration that is suitable for spinning, upon which the solution is forced through a spinneret and the filaments obtained are passed through a coagulation bath, in which the solvent is removed and the polymer precipitates.

Besides the above-mentioned applications for synthetic polyvinyl alcohol fibres, there is increasing demand and a growing market for so-called technical-grade polyvinyl alcohol fibres, for instance for composite applications.

For these applications the fibres are to have a higher modulus and tensile strength.

Numerous methods have already been proposed, particularly in patent literature, for the preparation of polyvinyl alcohol fibres patent literature, for the preparation of polyvinyl alcohol fibres having improved mechanical properties.

From Applied Polymer Symposia No. 6 (1967), pp. 109-149 for instance, it is known to prepare fibres having a tensile strength of about 1.2 GPa by coagulation spinning (phase separation) of dilute solutions of polyvinyl alcohol in organic solvents, followed by stretching. From FR-A-1.280.192 it is known to prepare fibres having a maximum tensile strength of 1.7 GPa by coagulation followed by stretching, starting from solutions of polyvinyl alcohol in water in the presence of boric acid.

In the above-mentioned publications nothing is said about the moduli of the fibres obtained. From DE-B-2.132.055 it is known to convert a solution of polyvinyl alcohol in water into fibres having a maximum tensile strength of about 1.8 GPa and a maximum modulus of about 40 GPa through coagulation spinning and a special, extremely laborious multistage stretching operation with interim water treatment.

All the methods referred to start from a polyvinyl alcohol having a relatively low weight-average molecular weight, in general between $6 \times 10^4$ and $12 \times 10^4$, the fibres obtained having a strength and modulus that, though being higher than those of commercially available synthetic polyvinyl alcohol fibres, are not yet high enough for most technical applications.

It further is known to prepare fibres of very high tensile strength and modulus starting from solutions of polymers having a high molecular weight, see GB-B 2.042.414 and 2.051.667. According to the process described in GB-B 2.042.414, to this end a dilute solution of, for instance, polyethylene is spun, the filament obtained is cooled to a gel filament, and the solvent-containing gel filament is stretched at elevated temperature. According to the process described in GB-B-2.051.667 to this end a solution of high molecular weight polyethylene is spun, the solvent is optionally removed largely or partly, and the gel filament is subjected at a specific temperature to stretching at a high stretch ratio that is related to the molecular weight. In these known processes it has been found that the moduli, but especially the tensile strengths, that can be attained increase with the molecular weight of the polyethylene.

These known processes can, therefore, be used to prepare polyethylenebased fibres having a tensile strength well in excess of 1.2 GPa and moduli of more han 20 GPa.

According to the above-mentioned GB-B-2.042.414 the process proposed in it can be used, inter alia, to prepare fibres having a high strength and modulus from polyvinyl alcohol. This is confirmed by, for instance, EP-A-105.169, which discloses a process for the preparation of fibres having a high tensile strength (1.3-2.2 GPa and a high modulus (40-70 GPa) by spinning of a dilute solution of high molecular weight polyvinyl alcohol, with a weight-average molecular weight well in excess of $5 \times 10^5$, in particular well in excess of $1 \times 10^6$, cooling of the spun filament to obtain a gel filament, and stretching of this filament after extraction of the solvent.

Though these processes yield polyvinyl alcohol fibres having very good mechanical properties, there is a disadvantage in that (very) high molecular weight polyvinyl alcohol is to be started from, which must be used in the form of relatively strongly dilute solutions because of the high viscosity, which of course greatly reduces the process efficiency and entails increased cost of separating and recovering solvents.

In addition, the preparation of such high molecular weight polyvinyl alcohol, for instance through photo initiated polymerisation of vinyl acetate followed by methanolysis, is extremely laborious, while it also is extremely difficult to prepare a homogeneous solution of such a polyvinyl alcohol.

According to EP-A-146.084 it is possible to prepare fibres of high strength and modulus starting from a polyvinylalcohol having a relatively low molecular weight, by applying a special dry/wet coagulation spinning process, followed by cooling, solvent removal and drawing. A disadvantage of the process of EP-A-146.084 and also of EP-A-105.169 is that the removal of the solvent applied from the fibres by e.g. extraction is extremely difficult. In EP-A-105.169 an extraction time of 92 hours is mentioned. So both processes are not suitable for commercial operation.

The present invention provides a process for the preparation of articles having a high strength and modulus from polyvinyl alcohol having a relatively low molecular weight in which the above-mentioned disadvantages are not or hardly present.

Though the invention relates in the first place to the preparation of filaments or fibres, it also relates to the preparation of tapes, ribbons, films, tubes, bars or profiles on the basis of polyvinyl alcohol.

The invention relates to a process for the preparation of an article having a high tensile strength and modulus from polyvinyl alcohol which is characterized in that:

(a) a 5-50 wt. % solution of a polyvinyl alcohol with a weight-average molecular weight of between $2.5 \times 10^4$ and $5 \times 10^5$ in water is converted into a shaped, water-containing article at a temperature above the dissolution temperature;

(b) this article is converted into a gel article having a homogeneous gel structure by rapid cooling to below the freezing temperature;

(c) the water present in this gel article is largely removed at a temperature below the melting point of the gel;

(d) during or after water removal, the gel article is stretched at a temperature above the glass transition temperature but below the decomposition temperature of polyvinyl alcohol with a stretch ratio of at least 10:1.

In the process according to the invention a polyvinyl alcohol is used that has a weight-average molecular weight of between $2.5 \times 10^4$ and $5 \times 10^5$, by preference between $5 \times 10^4$ and $3 \times 10^5$. Such a polymer is prepared on industrial scale, usually by polymerisation of vinyl acetate followed by hydrolysis. The term polyvinyl alcohol should be understood as meaning a polymer consisting to at least 50% of vinyl alcohol monomer. The polymer may further contain minor amounts of polymers or other substances, such as fillers and the like, that are compatible with polyvinyl alcohol.

The solutions to be used can be prepared in various ways, for instance by suspending solid polyvinyl alcohol in water, followed by stirring at elevated temperature, or by converting the suspension using a twin-screw extruder provided with mixing and conveying facilities.

The concentration of the solution to be used may vary. It has been found that highly concentrated solutions can be used in the process according to the invention. Preferably 20 to 40 wt. % solutions will be used.

Conversion of the solution into a shaped, water-containing article can be effected in various ways in the process according to the invention, for instance by spinning into a filament or ribbon using a spinneret with a round or slit-shaped aperture, respectively, or by extruding using an extruder, usually with a profiled head.

The temperature during conversion is to be higher than the dissolution temperature. This dissolution temperature, of course, depends on the concentration, the molecular weight of the polyvinyl alcohol and the pressure used. For water it is about 20° C.

In general, the conversion temperature will be chosen well above the dissolution temperature, for instance about 75°–95° C.

It goes without saying that this temperature is kept below the polyvinyl alcohol decomposition temperature.

An essential part of the process according to the invention is cooling to below the freezing temperature of the shaped, water-containing articles such that a gel object whith a homogeneous gel structure is obtained, use being made of rapid cooling, preferably using a liquid cooling (quenching) medium.

Although in principle gelation by cooling to below the gelation temperature, e.g. to 10° C. can be effected, this is not practical seeing the very long cooling times (several days) needed. Therefore preferably cooling to at least 40° C. below the gelation temperature is applied.

It has further been found that the nature of the cooling medium, too, influences the mechanical properties of the articles ultimately obtained. Suitable media are dichloromethane, liquid nitrogen or mixtures of aceton and $CO_2$.

There further may be advantage in subjecting the article to a draw-down prior to cooling. It is preferred to limit the draw-down ratio to maximum 20 : 1, the most preferred draw-down ratio being maximum 10 : 1.

It has further been found that a product having better mechanical properties can be obtained if a higher spinning rate is used.

From the gel article obtained after cooling, subsequently the larger part of the water still present is removed. This can be done, for instance, by evaporation, but preferably extraction is used for this purpose. Aliphatic alcohols, in particular methanol, and ketones have been found to be very suitable as extraction agents. If desired, the extraction can be effected at elevated temperature, but the temperature must be lower than that at which the gel dissolves.

During or, preferably, after water removal (extraction), the gel articles are stretched in one or more steps with a stretch ratio of at least 10. The temperature is then generally kept above the glass transition temperature, but below the decomposition temperature of polyvinyl alcohol. By preference, stretching is effected at a temperature of between 160° and 240° C., in particular between 180° and 230° C.

It has been found that high stretch ratios can be applied in the subject process. Preferably, a stretch ratio of at least 20 : 1 is used.

The articles according to the invention are suitable for virtually all technical applications, such as composite applications, precursor of high-quality carbon fibres, replacement of glass fibres, etc.

If desired, minor amounts of customary additives, stabilisers and the like can be incorporated in or on the articles.

The invention will be elucidated in the following examples, without, however, being restricted thereto.

EXAMPLE I

An amount of polyvinyl alcohol powder with a weight-average molecular weight of $1.15 \times 10^5$ g/mol (obtained from the Aldrich company) and a degree of hydrolysis of 100% was added to water in an amount of 25 g per 100 ml water, upon which the suspension was stirred for four hours at 95° C.

The spinning solution was transferred to a double-walled cylinder which was thermostatted with oil heating at a temperature of 95° C. By means of a piston coupled to a variable-speed motor, the solution was forced through a capillary (0.5 mm diameter) into a quench bath at a rate of 130 ml/hour. As quenching medium, use was made of liquid nitrogen; the quench temperature was −196° C. The quenched filaments were wound at a rate of 28 cm/sec., which corresponded to a draw-down ratio of V =3. The filament was then deposited in an extraction bath (methanol) at 20° C. The extracted filament was air-dried at 20° C. and subsequently stretched with a stretch ratio of 23:1 at 190° C. The filament obtained had a tensile strength of 1.6 GPa, a modulus of 48 GPa and an elongation of 4.3%.

The tensile strengths and moduli of the filaments thus obtained were determined using a Zwick 1445 tensile testing machine. The specimen length was 50 mm and the rate of elongation 5 mm/min. The initial modulus was determined from the tangent to the initial section of the stress-strain curve.

EXAMPLES II-IX

The process of Example I was repeated with different quench media, temperatures, spinning rates and winding rates.

The results are summarised in Table I.

COMPARATIVE EXAMPLE A

The process of Example IX was repeated but with a cooling temperature below the gelation point, but above the freezing point. No stretchable or manageable filament was obtained.

TABLE I

| Example No. | Spinning rate (ML/h) | Winding rate (cm/sec) | Draw-down | Quench batch Medium | Temp. (°C.) | Stretch ratio | Strength (GPa) | Modulus (GPa) | Elongation (%) |
|---|---|---|---|---|---|---|---|---|---|
| II | 168 | 36 | 1.5 | Liquid Nitrogen | −196 | 26 | 1.35 | 40 | 4.3 |
| III | 168 | 36 | 1.5 | Aceton/$CO_2$ | −60 | 19 | 1.34 | 40 | 4.8 |
| IV | 168 | 36 | 1.5 | Dichloro-Methane | −60 | 21 | 1.43 | 42 | 4.4 |
| V | 168 | 36 | 1.5 | Dichloro-Methane | −30 | 19 | 1.32 | 43 | 4.8 |
| VI | 168 | 70 | 3.0 | Dichloro-Methane | −60 | 23 | 1.53 | 54 | 4.5 |
| VII | 168 | 70 | 3.0 | Dichloro-Methane | −60 | 29 | 1.79 | 57 | 5.2 |
| VIII | 130 | 28 | 3 | Liquid Nitrogen | −196 | 27 | 1.86 | 58 | 5.0 |
| IX | 168 | 36 | 1.5 | Aceton/$CO_2$ | −60 | 22 | 1.45 | 48 | 6.0 |

What we claim is:

1. Process for the preparation of an article having a high tensile strength and modulus from polyvinyl alcohol wherein:
   (a) a 5–50 wt. % solution of a polyvinyl alcohol with a weight-average molecular weight of between $2.5 \times 10^4$ and $5 \times 10^5$ in water is converted into a shaped, water-containing article at a temperature above the dissolution temperature;
   (b) this article is converted into a gel article having a homogeneous gel structure by rapid cooling to below the freezing temperature;
   (c) the water present in this gel article is largely removed at a temperature below the melting point of the gel;
   (d) during or after water removal, the gel article is stretched at a temperature above the glass transition temperature but below the decomposition temperature of polyvinyl alcohol with a stretch ratio of at least 10:1.

2. Process according to claim 1, wherein use is made of a polyvinyl alcohol with a weight-average molecular weight of between $5 \times 10^4$ and $3 \times 10^5$.

3. Process according to claim 1, wherein use is made of a 20–40 wt. % solution.

4. Process according to claim 1, wherein the shaped, water-containing article is subjected to a draw-down prior to cooling.

5. Process according to claims 1, wherein the water-containing article is quenched in a liquid medium.

6. Process according claims 1, wherein the gel article is extracted using a saturated aliphatic alcohol or ketone.

7. Process according to claim 1, wherein the gel article is stretched at a temperature of between 160° and 240° C. using a stretch ratio of at least 20:1.

8. Process for the preparation of an article having a high tensile strength and modulus from polyvinyl alcohol wherein:
   (a) a 5–50 wt % solution of a polyvinyl alcohol with a weight-average molecular weight of between $2.5 \times 10^4$ and $5 \times 10^5$ in water is converted into a shaped, water-containing article at a temperature above the dissolution temperature;
   (b) this article is converted into a gel article having a homogenous gel structure by rapid cooling to below the freezing temperature of said water-containing article to a temperature of at least 40° C. below the gelation temperature;
   (c) the water present in this gel article is largely removed at a temperature below the melting point of the gel;
   (d) during or after water removal, the gel article is streched at a temperature above the glass transition temperature but below the decomposition temperature of polyvinyl alcohol with a stretch ratio of at least 10:1.

* * * * *